United States Patent
Yang et al.

(10) Patent No.: US 10,763,494 B2
(45) Date of Patent: *Sep. 1, 2020

(54) GRAPHENE/ORGANIC SOLVENT DISPERSION AND METHOD FOR PRODUCING SAME, AND METHOD FOR PRODUCING LITHIUM-ION BATTERY ELECTRODE

(71) Applicant: TORAY INDUSTRIES, INC., Tokyo (JP)

(72) Inventors: Hanxiao Yang, Otsu (JP); Eiichiro Tamaki, Otsu (JP); Manabu Kawasaki, Otsu (JP); Yoshihide Hirai, Otsu (JP); Koki Miyazono, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 295 days.

This patent is subject to a terminal disclaimer.

(21) Appl. No.: 15/760,510

(22) PCT Filed: Sep. 9, 2016

(86) PCT No.: PCT/JP2016/076655
§ 371 (c)(1),
(2) Date: Mar. 15, 2018

(87) PCT Pub. No.: WO2017/047522
PCT Pub. Date: Mar. 23, 2017

(65) Prior Publication Data
US 2018/0261830 A1 Sep. 13, 2018

(30) Foreign Application Priority Data
Sep. 18, 2015 (JP) .................. 2015-184814

(51) Int. Cl.
*H01M 4/139* (2010.01)
*H01M 4/62* (2006.01)
*C01B 32/194* (2017.01)
*C01B 32/19* (2017.01)
*H01M 10/0525* (2010.01)

(52) U.S. Cl.
CPC ............. *H01M 4/139* (2013.01); *C01B 32/19* (2017.08); *C01B 32/194* (2017.08); *H01M 4/62* (2013.01); *H01M 4/623* (2013.01); *H01M 4/625* (2013.01); *H01M 10/0525* (2013.01)

(58) Field of Classification Search
CPC ..... C01B 32/182; C01B 32/184; C01B 32/19; C01B 32/192; C01B 32/194; H01M 4/139; H01M 4/62; H01M 4/623; H01M 4/625; H01M 10/0525
See application file for complete search history.

(56) References Cited

U.S. PATENT DOCUMENTS

| 2011/0121240 A1* | 5/2011 | Amine ................ H01M 4/0402 252/502 |
| 2015/0140438 A1 | 5/2015 | Sun et al. |
| 2018/0261402 A1* | 9/2018 | Manabe ............... B01J 13/0026 |
| 2018/0269465 A1* | 9/2018 | Hirai ..................... H01M 4/625 |

FOREIGN PATENT DOCUMENTS

| JP | 2014009151 A | 1/2014 |
| JP | 2015059079 A | 3/2015 |
| JP | 2015520109 A | 7/2015 |
| WO | 2007047084 A2 | 4/2007 |
| WO | 2013181994 A1 | 12/2013 |
| WO | 2014140324 A1 | 9/2014 |
| WO | 2015122498 A1 | 8/2015 |

OTHER PUBLICATIONS

Texter, J-Graphene dispersions, Current Opinion in Colloid & Interface Science 19 (2014), pp. 163-174 (Year: 2014).*
International Search Report and Written Opinion for International Application No. PCT/JP2016/076655, dated Oct. 18, 2016, 5 pages.

* cited by examiner

*Primary Examiner* — Anca Eoff
(74) *Attorney, Agent, or Firm* — RatnerPrestia

(57) ABSTRACT

A graphene/organic solvent dispersion liquid is in a stably dispersed state and also unlikely to cause electrolysis of water. A graphene/organic solvent dispersion liquid is also provided including graphene dispersed in an organic solvent and having a value of $(W2-W1)/G$ in the range of 0.005 or more and 0.05 or less, wherein W1 and W2 are the water fractions measured at 130° C. and 250° C., respectively, by the Karl Fischer's method and G is the solid fraction of the graphene.

15 Claims, No Drawings

GRAPHENE/ORGANIC SOLVENT DISPERSION AND METHOD FOR PRODUCING SAME, AND METHOD FOR PRODUCING LITHIUM-ION BATTERY ELECTRODE

CROSS REFERENCE TO RELATED APPLICATIONS

This is the U.S. National Phase application of PCT/JP2016/076655, filed Sep. 9, 2016, which claims priority to Japanese Patent Application No. 2015-184814, filed Sep. 18, 2015, the disclosures of these applications being incorporated herein by reference in their entireties for all purposes.

TECHNICAL FIELD OF THE INVENTION

The present invention relates to a graphene/organic solvent dispersion liquid and a production method therefor, as well as a method for producing electrodes for lithium ion batteries from the graphene/organic solvent dispersion liquid.

BACKGROUND OF THE INVENTION

Graphene is in the form of a two-dimensional crystal of carbon atoms and great attention has been focused on graphene as industrial material since its discovery in 2004. Graphene has excellent electric, thermal, optical, and mechanical characteristics, and there are growing expectations for its applications in wide areas such as production of battery materials, energy storage materials, electronic devices, and composite materials.

To realize such applications of graphene, it is essential to develop efficient production methods for cost reduction and improve the dispersibility.

Methods available for the production of graphene include the mechanical exfoliation method, CVD (chemical vapor deposition) method, and CEG (crystal epitaxial growth) method, but these methods are so low in productivity that they are not suitable for mass production. Compared to this, the oxidization-reduction method (oxidized graphite, also called oxidized black lead, is produced first through oxidization of natural graphite, followed by converting it into graphene through reduction reaction) is a very important means of practical manufacturing of graphene because it can serve for large-scale synthesis of graphene.

Graphene not only has high electric conductivity, but also has a thin, flat structure to serve for forming a large number of conductive paths, and accordingly, it has a high potential particularly as a conductive material for batteries. However, graphene is a kind of nanocarbon and tends to undergo agglomeration easily. If produced by simply carrying out oxidization and reduction, therefore, the resulting graphene will not be able to disperse moderately in the matrix to realize its full potential.

In Patent document 1, graphene oxide is expanded and exfoliated while it is heated for reduction in order to produce thin layers of graphite with a large specific surface area.

In Patent document 2, graphene is chemically reduced in the presence of catechol and subsequently freeze-dried to prepare a graphene powder with high dispersibility.

In Patent document 3, graphene oxide is chemically reduced in the presence of a water-soluble compound having a 9,9-bis-(substituted aryl)-fluorene backbone and the resulting aqueous graphene sedimentation is mixed with an organic solvent. Then, graphene is recovered by centrifugal sedimentation and an organic solvent is added to prepare a graphene/organic solvent dispersion.

PATENT DOCUMENTS

[Patent Document 1]: International Publication WO 2007/047084
[Patent Document 2]: International Publication WO 2013/181994
[Patent document 3] Japanese Unexamined Patent Publication (Kokai) No. 2015-059079

SUMMARY OF THE INVENTION

If produced by heating and expansion as proposed in Patent document 1, the resulting graphene, which has experienced a high temperature heating step, seriously lacks functional groups and water on the graphene surface, making it impossible to disperse smoothly in an organic solvent. Therefore, when applied to lithium ion battery electrodes, for example, it will not be dispersed smoothly in the matrix.

If graphene is produced by chemical reduction and freeze-dried to form a graphene powder as in Patent document 2, a large quantity of water will remain on the graphene surface. When it is applied batteries or the like, part of the bound water will undergo electrolysis to cause degradation of the battery.

If an aqueous graphene dispersion, mixed with an organic solvent, is filtered and redispersed in the organic solvent, as proposed in Patent document 3, the process contains no step that can serve for thorough removal of water from the graphene/organic solvent dispersion liquid and therefore, a large quantity of water will remain on the graphene and partly undergo electrolysis to cause degradation of the battery.

Thus, it is impossible to produce a graphene/organic solvent dispersion liquid that is in a stably dispersed state and also unlikely to cause electrolysis of water.

As a result of intensive studies, the inventors found that a graphene product in an ideal dispersed state can be developed if the quantity of bound water on the graphene surface is controlled appropriately.

Thus, one aspect of the present invention provides a graphene/organic solvent dispersion liquid including graphene dispersed in an organic solvent and having a value of $(W2-W1)/G$ in the range of 0.005 or more and 0.05 or less, wherein W1 and W2 are the water fractions measured at 130° C. and 250° C., respectively, by the Karl Fischer's method and G is the solid fraction of the graphene.

The production method for the graphene/organic solvent dispersion liquid according to another aspect of the present invention include:

a reduction step for reducing graphene oxide dispersed in a water-containing dispersion medium;

an organic solvent mixing step for mixing the intermediate dispersion liquid resulting from the reduction step with an organic solvent;

a strong stirring step for stirring the intermediate dispersion liquid containing an organic solvent at a shear rate of 5,000 per second to 50,000 per second; and a water removal step for removing at least part of the water from the intermediate dispersion liquid by a combination of the addition of an organic solvent and suction filtration or by distillation;

which are carried out in this order.

The graphene component contained in the graphene/organic solvent dispersion liquid according to the present invention has a moderate content of bound water and accordingly, has a preferred dispersibility to ensure strong interaction with the organic solvent. The term "bound water" used herein refers to a water component that maintains strong bond with graphene that cannot be removed at 130° C. or less, rather than free water that can move freely in the solvent or adsorbed water that is removed easily at temperatures higher than the boiling point of water. The existence of bound water around acidic groups in graphene acts to promote the interaction with the organic solvent in the vicinity to enhance the dispersibility. If materials such as resin and electrode paste are kneaded with a graphene/organic solvent dispersion liquid having high dispersibility, they can form a highly conductive network in the matrix as they are dried. If graphene layers are stacked, bound water acts to prevent them from adhering to each other and gaps are formed to achieve an increased conductivity. Thus, the existence of bound water works to ensure both high electric conductivity and high ion conductivity.

Accordingly, electrically conductive networks formed in an electrode active material by using the graphene/organic solvent dispersion liquid according to the present invention in combination with a binder enables the production of a lithium ion battery electrode having high electrical discharge performance.

DETAILED DESCRIPTION OF EMBODIMENTS OF THE INVENTION

<Graphene/Organic Solvent Dispersion Liquid>

For the graphene/organic solvent dispersion liquid (hereinafter occasionally referred simply to graphene dispersion liquid) according to embodiments of the present invention, it is preferable for the value of (W2−W1)/G to be 0.005 or more and 0.05 or less, wherein W1 (unit: g/g) is the water fraction measured at 130° C. by the Karl Fischer's method; W2 (unit: g/g) is the water fraction measured at 250° C. by the Karl Fischer's method; and G (unit: g/g) is the solid fraction of the graphene.

Here, W1 shows the proportion of the sum of roughly calculated amounts of the free water contained in the organic solvent in the graphene/organic solvent dispersion liquid and the adsorbed water that is adsorbed on the graphene but can be removed easily. On the other hand, W2 denotes the proportion of the combined amount of the aforementioned sum of free water and adsorbed water and the bound water that is strongly bonded to the graphene surface and cannot be removed at a temperature as high as 130° C. Thus, (W2−W1) gives a roughly calculated content of the bound water that is strongly bonded to the graphene.

Such bound water is bonded strongly via the hydroxyl group, carboxyl group, epoxy group, carbonyl group, etc., contained in the graphene. The existence of this bound water allows the graphene and the organic solvent to interact easily with each other, thereby enabling stable dispersion. It is important therefore that the weight ratio of the bound water to the graphene be controlled in an appropriate range.

The existence of bound water also serves to improve the ion conductivity of the graphene. Graphene has a thin, plate-like structure and in addition, π-π interaction occurs between graphene layers, serving to promote the stacking of the layers. It is difficult for ions to move in graphene if these graphene layers are stacked without interlaminar gaps. Compared to this, if graphene contains a moderate amount of bound water, interlaminar gaps are formed easily between stacked graphene layers, leading to an increased number of ion conducting paths and an improved ion conductivity.

If the value of (W2−W1)/G is less than 0.005, interaction with the organic solvent will be reduced and agglomeration will be promoted. After entering an electrode in a lithium ion battery, agglomerated graphene cannot easily form conductive paths and in addition, the ion conductivity will be low, leading to deterioration in charge and discharge performance. If the value of (W2−W1)/G is more than 0.05, graphene in a lithium ion battery may suffer electrolysis of part of the bound water to cause gas generation, which will have adverse influence on the battery performance. If the value of (W2−W1)/G is controlled in the range of 0.005 or more and 0.05 or less, it serves to achieve good dispersion in the organic solvent to ensure both the formation of good conductive paths and high ion conductivity in the electrodes in a lithium ion battery. It is preferable for the value of (W2−W1)/G to be 0.008 or more, more preferably 0.01 or more. It is also preferable for the value of (W2−W1)/G to be 0.03 or less, more preferably 0.02 or less.

W1 and W2 denote the weight proportion (g/g) of the weight of water to the weight of the graphene/organic solvent dispersion liquid measured by the Karl Fischer's method. More specifically, they are measured by the water evaporation—coulometric titration procedure specified in JIS K 0113 (2005) 8.3. There are no specific limitations on the measuring apparatus to be used, and any appropriate commercial water fraction measuring apparatus may be adopted. Examples of such a water fraction measuring apparatus include AQ-2200 Karl Fischer Aquameter manufactured by Hiranuma Sangyo Co., Ltd.

The solid fraction G (g/g) of graphene in a graphene/organic solvent dispersion liquid can be determined after removing the solvent from the graphene dispersion liquid by measuring the weight of the dried material and dividing the measured value by the weight of the graphene dispersion liquid itself. Specifically, 1 gram of a graphene dispersion liquid is adhered to a glass substrate with a known weight and heated for 1.5 hours on a hot plate adjusted to a temperature of 120° C. to volatilize the solvent, followed by calculation using the measured weight of the remaining graphene material.

The solid fraction of the graphene/organic solvent dispersion liquid according to the present invention is preferably 0.40 or less, more preferably 0.20 or less, still more preferably 0.10 or less, still more preferably 0.07 or less, and particularly preferably 0.05 or less. Similarly, it is preferably 0.003 or more, more preferably 0.005 or more, and still more preferably 0.01 or more. If the solid fraction is 0.05 or less, the flowability tends to increase, leading to a high handleability. As the solid fraction becomes more than 0.40, the graphene tends to suffer layered agglomeration in the dispersion liquid, making it difficult to maintain a good dispersed state, whereas when used for electrode paste production, a solid fraction of less than 0.003 will lead to an electrode paste with a decreased solid fraction due to the solvent in the dispersion liquid, leading to a decrease in viscosity and deterioration in coating properties.

It is preferable for the graphene dispersion liquid according to the present invention to contain a surface treatment agent having an acidic group (hereinafter occasionally referred to simply as surface treatment agent). The surface treatment agent should be at least partly adhered to the surface of the graphene to have the effect of enhancing the dispersibility of the graphene. Here, the acidic group is a hydroxyl group, phenolic hydroxyl group, nitro group, carboxyl group, or carbonyl group. There are no specific limitations on the acidic group, and it may be either a polymer compound or a low molecular weight compound.

In particular, compounds having catechol groups are preferred as surface treatment agents because they are generally adhesive to graphene and dispersible in solvents. Such compounds having catechol group include catechol, dopamine hydrochloride, 3-(3,4-dihydroxyphenyl)-L-alanine, 4-(1-hydroxy-2-aminoethyl) catechol, 3,4-dihydroxy benzoic acid, 3,4-dihydroxyphenyl acetic acid, caffeic acid, 4-methyl catechol, and 4-tert-butyl pyrocatechol.

The acidic group existing in a surface treatment agent is preferably a phenolic hydroxyl group. Examples of a compound having a phenolic hydroxy group include phenol, nitro phenol, cresol, catechol, and compounds having a structure that can be formed by at least partial substitution thereof.

A surfactant having an acidic group may also be used preferably as surface treatment agent. Examples of the surfactant include cationic surfactants, anionic surfactants, and nonionic surfactants, but since anions and cations may participate themselves in electrochemical reactions, nonionic surfactants are preferred for use in battery materials because they are not ionized.

The surface treatment agent may contain a basic group in addition to an acidic group, and in particular, its dispersibility is enhanced if having an amino group. Accordingly, a compound having both a catechol group and an amino group may be particularly preferred as surface treatment agent. Examples of such a compound include dopamine hydrochloride.

For the graphene dispersion liquid according to the present invention, the median diameter D (μm) of the graphene measured by the laser diffraction/scattering type particle size distribution measurement method and the average size S (μm) in the planar direction of the graphene calculated from the arithmetic mean of the longest diameter and shortest diameter of the graphene observed by a laser microscope preferably meet both Equations (1) and (2) given below:

$$0.5\ \mu m \leq S \leq 15\ \mu m \quad (1)\ \text{and}$$

$$1.0 \leq D/S \leq 3.0. \quad (2).$$

For a graphene dispersion liquid, the median diameter D (μm) of graphene is a particle diameter corresponding to the median of its particle size distribution determined by subjecting the liquid to laser diffraction/scattering type particle size distribution measurement. Useful measuring apparatuses include the Laser Scattering Particle Size Distribution Analyzer LA-920 particle size distribution measuring apparatus manufactured by Horiba. Specifically, the graphene dispersion liquid is diluted with N-methylpyrrolidone (NMP) to 0.5 mass % and the particle size distribution is determined by the particle size distribution measuring apparatus. The particle diameter corresponding to the median is adopted as median diameter (D) of the graphene.

If the size S (μm) in the planar direction of the graphene (average of the longest diameter and the shortest diameter) is too small, the number of contacts between graphene flakes will be so large that the electric resistance will tend to increase, whereas if it is too large, the graphene will be low in the degree of exfoliation and dispersibility in the solvent and it is feared that when used as paste for electrodes, it may suffer from poor coating properties and low coat film quality. There are no specific limitations on the size S (μm), but it is preferably 0.5 μm or more, more preferably 0.7 μm or more, and still more preferably 1.0 μm or more whereas it is preferably 15 μm or less, more preferably 10 μm or less, and still more preferably 4 μm or less.

If the D/S ratio is too small, the graphene will have a folded, instead of planar, structure in the solvent. In this case, each graphene layer will be isolated, possibly failing to form good conductive paths in the resulting electrodes. If the D/S ratio too large, on the other hand, the graphene layers will be in an excessively agglomerated state, making it difficult to achieve required degrees of exfoliation and dispersibility. The D/S ratio is preferably 1.0 or more 3.0 or less and more preferably 1.4 or more 2.5 or less.

For the graphene dispersion liquid according to the present invention, furthermore, the average thickness T (μm) of graphene observed by a laser microscope preferably meets Equation (3) given below:

$$100 \leq S/T \leq 1500 \quad (3).$$

The average thickness T (nm) of graphene should be determined as described below. First, the graphene dispersion liquid is diluted with NMP to 0.002 mass %, dropped on a glass substrate, and dried. Then, the graphene on the substrate is observed by a laser microscope, which serves for observation of three dimensional shapes, and the thickness of each graphene layer is measured. For a flake having a thickness distribution, the average over the surface area is determined. A total of 50 graphene flakes are selected randomly, and their thicknesses are calculated and averaged to give the average thickness T.

If the S/T ratio is less than 100, it means that the thickness in the layer stacking direction of the graphene flakes is large relative to the size in the planar direction of the graphene flakes. In this case, the electrodes produced will have poor electric conductivity. If the S/T ratio is larger than 1,500, on the other hand, it means that the thickness in the layer stacking direction of the graphene flakes is small relative to the size in the planar direction of the graphene flakes. In this case, the viscosity of the dispersion liquid itself and that of electrode pastes produced therefrom are likely to increase, possibly leading to a decrease in workability during handling. For the graphene dispersion liquid according to the present invention, it is preferable for the following equation to hold: $200 \leq S/T \leq 800$.

The thickness T and the size in the planar direction S of graphene can be measured using an atomic force microscope, laser microscope, etc., on a specimen prepared by spreading and drying the diluted solution on a substrate.

Useful examples of the atomic force microscope to be used to measure the thickness T include Dimension Icon manufactured by Bruker. According to a typical measuring procedure, a specimen of the graphene dispersion liquid is diluted with NMP to 0.002 mass %, dropped on a mica substrate, and dried to allow it to adhere to the substrate. The graphene specimen on the substrate is observed by an atomic force microscope and the thickness of the graphene specimen is measured at randomly selected 50 points, followed by calculating the average T. For a specimen having a significant thickness variation, the average over the surface area is adopted to represent its thickness.

Useful examples of the laser microscope used for measuring the size S in the planar direction include the VK-X250 laser microscope manufactured by Keyence Corporation. According to a typical measuring procedure, a specimen of the graphene dispersion liquid is diluted with the NMP solvent to 0.002 mass %, dropped on a glass substrate, and dried to allow it to adhere to the substrate. A graphene specimen on a substrate is observed. Fifty fragments were randomly selected and the longest size (largest diameter) and the shortest size (smallest diameter) across each graphene fragment is measured. The value of (largest diameter+smallest diameter)/2 was calculated for the 50 fragments and the average was adopted as the size in the planar direction of graphene (S).

In the graphene/organic solvent dispersion liquid according to an embodiment of the present invention, the organic solvent has an NMP content of 50 mass % or more, and a solution diluted with NMP in which graphene accounts for a weight fraction adjusted to 0.000013 relative to the entire diluted solution that has a weight fraction of 1 preferably has a weight-based absorptivity coefficient as calculated by Equation (4) given below (hereinafter referred to simply as weight-based absorptivity coefficient) in the range of 25,000 cm$^{-1}$ or more and 200,000 cm$^{-1}$ or less at a wavelength of 270 nm, $$\text{weight-based absorptivity coefficient (cm}^{-1}\text{)=absorbance/}\{0.000013 \times \text{cell's optical path length (cm)}\} \quad (4).$$

The absorbance per unit weight of graphene varies depending on the degree of exfoliation of the graphene, and it is highest for monolayer graphene and decreases with an increasing number of layers and an increasing degree of agglomeration, suggesting that a preferable range exists. If the weight-based absorptivity coefficient is in the range of 25,000 cm-1 or more and 200,000 cm-1 or less, a moderate surface area and dispersibility will be realized simultaneously and good conductive paths will be formed and maintained easily in resin, electrode paste, or the like. The weight-based absorptivity coefficient is more preferably 40,000 cm-1 or more and 150,000 cm-1 or less, and still more preferably 45,000 cm-1 or more and 100,000 cm-1 or less.

For a diluted solution prepared as described above, furthermore, the ratio between the absorbance at a wavelength of 270 nm and that at 600 nm as calculated by Equation (5) given below (hereinafter simply referred to as absorbance ratio) is preferably 1.70 or more and 4.00 or less, more preferably 1.80 or more and 3.00 or less, and still more preferably 1.90 or more and 2.50 or less:

$$\text{absorbance ratio=absorbance (270 nm)/absorbance (600 nm)}. \quad (5)$$

The absorbance of light contains an absorption component and a scattering component, and the scattering component varies with the surface state of the graphene. The contribution of the scattering component to the absorbance is small at a wavelength of 270 nm, but the absorption component is smaller at a wavelength of 600 nm, leading to an increased contribution of the scattering component to the absorbance. If the graphene contained has a high degree of agglomeration, the absorbance ratio will be less than 1.70, possibly making it difficult to form and maintain good conductive paths in resin or electrode paste. As the graphene is granulated excessively, the absorbance ratio will become larger than 4.00, possibly leading to increased tendency to agglomerate in resin or electrode paste.

Here, the absorbance of a diluted solution prepared from graphene dispersion liquid can be measured using an ultraviolet and visible spectrophotometer. The absorbance values of graphene to be used in Equations (4) and (5) given above can be obtained by subtracting the absorbance of the solvent used in the diluted solution from the absorbance of the diluted solution prepared from the graphene dispersion liquid.

There are no specific limitations on the organic solvent to be used in the graphene/organic solvent dispersion liquid according to the present invention, but a solvent with a high polarity is preferable because such a solvent can easily interacts with bound water. The solvent with a high polarity is preferably an organic solvent having a dipole moment of 3.0 Debye or more. Examples of such solvents include N-methylpyrrolidone, γ-butyrolactone, dimethyl acetamide, dimethyl formamide, dimethyl sulfoxide, acetonitrile, and mixtures thereof.

Furthermore, since highly volatile solvents are difficult to handle in a stable way, it is preferable to adopt a solvent with a high boiling point. It is preferable for the solvent to have a boiling point of 150° C. or more, preferably 180° C. or more.

N-methylpyrrolidoneis particularly preferred as a solvent having both a high polarity and a high boiling point. The lactam structure contained in N-methylpyrolidone is high in affinity not only for nitrogen-containing functional groups such as amino group and nitro group but also for water. As described later, the graphene to be used preferably has nitrogen on the surface and in that case, the three components of graphene's bound water, nitrogen, and N-methylpyrrolidone can interact with each other to form a good dispersion state. Accordingly, the organic solvent preferably has a N-methylpyrrolidone content of 50 mass % or more.

For the graphene contained in the graphene/organic solvent dispersion liquid according to the present invention, the specific surface area as measured by the BET measuring method (hereinafter occasionally referred to simply as specific surface area) is preferably 80 m$^2$/g or more and 250 m$^2$/g or less. The specific surface area of graphene reflects the thickness of the graphene and the degree of exfoliation of the graphene. Specifically, the graphene becomes thinner and the degree of exfoliation becomes higher as it increases. It tends to become difficult for graphene to form a conductive network when applied to lithium ion batteries if its specific surface area is less than 80 m$^2$/g whereas the dispersibility tends to decrease if it is more than 250 m$^2$/g. The specific surface area of the graphene is preferably 100 m$^2$/g or more, more preferably 130 m$^2$/g or more. Similarly, it is preferably 200 m$^2$/g or less and more preferably 180 m$^2$/g or less. For the BET measuring method, a graphene dispersion liquid is predried by a vacuum dryer, freeze-drier, or the like, and the resulting dried specimen is examined according to the procedure specified in JIS Z 8830 (2013). The quantity of adsorbed gas is measured by the carrier gas method and the adsorption data are analyzed by the one point method.

The quotient of the value of (W2−W1)/G of the graphene/organic solvent dispersion liquid according to the present invention divided by the specific surface area of the graphene measured by the BET measuring method is preferably 0.000025 g/m$^2$ or more and 0.00025 g/m$^2$ or less. The quotient of (W2−W1)/G divided by the specific surface area represents the weight of bound water per unit surface area of graphene. If the weight of bound water per unit surface area of graphene is too large, the graphene will become unable to hold the bound water, leading easily to electrolysis of water. If the weight of bound water per unit surface area of graphene is too small, the graphene/organic solvent dispersion liquid will deteriorate in dispersion stability. The quotient of (W2−W1)/G divided by the specific surface area is preferably 0.000035 g/m$^2$ or more and 0.00015 g/m$^2$ or less, more preferably 0.000050 g/m$^2$ or more and 0.00010 g/m$^2$ or less.

For the graphene existing in the graphene/organic solvent dispersion liquid according to the present invention, there is a preferred range of the element ratio of oxygen to carbon (O/C ratio) determined by X-ray photoelectron spectroscopy. The procedure of X-ray photoelectron spectroscopy includes predrying a graphene/organic solvent dispersion liquid by a vacuum dryer, freeze-drier, or the like, introducing the dried specimen into a measuring chamber having a high vacuum chamber, applying soft X ray to the surface of the specimen placed in an ultrahigh vacuum, and detecting the photoelectrons released from the surface using an analyzer. These photoelectrons are examined by the wide scan and narrow scan modes and the binding energy of the bound electrons in the substance is determined to provide element information on the substance surface.

Examination of graphene by X-ray photoelectron spectroscopy detects the C1s peak attributed to carbon appearing near 284 eV. It is known that when the carbon is bonded to oxygen, the peak shifts toward the high energy side. More specifically, the peaks attributed to C—C bond, C═C double bond, or C—H bond, in which the carbon atoms are not bonded to oxygen, do not shift and appear near 284 eV, whereas the peaks attributed to C—O single bond, C═O double bond, and COO bond shift to near 286.5 eV, near 287.5 eV, and near 288.5 eV, respectively. As a result, signals derived from carbon atoms are detected in a shape of overlapping peaks located near 284 eV, near 286.5 eV, near 287.5 eV, and near 288.5 eV. At the same time, the N1s peak attributed to nitrogen is detected near 402 eV and the O1s peak attributed to oxygen is detected near 533 eV. Then, the O/C ratio can be calculated from the peak areas of the C1s peak and the O1s peak.

The oxygen atoms existing on the graphene surface are those in the acidic groups bonded to the graphene itself and those in the acidic groups contained in the surface treatment agent adhered to the graphene surface. These acidic groups serve to improve the dispersion state of the graphene and work also as contact points where bound water is bonded to the graphene. The dispersibility deteriorates if the graphene surface lacks acidic groups whereas the electric conductivity decreases, leading to deterioration in performance as conductive additive, if there exist excessive numbers of acidic groups on graphene surface. The O/C ratio of graphene is preferably 0.08 or more, more preferably 0.10 or more, and still more preferably 0.12 or more. Similarly, it is preferably 0.30 or less, more preferably 0.20 or less, and still more preferably 0.15 or less.

The O/C ratio of graphene can be controlled by changing the oxidation degree of the graphene oxide fed as starting material and the quantity of the surface treatment agent added. The number of the remaining oxygen atoms after the reduction treatment increases with an increasing oxidation degree of the graphene oxide whereas the number of the remaining oxygen atoms after the reduction treatment decreases with a decreasing oxidation degree. The number of oxygen atoms can be increased by adding an increased amount of a surface treatment agent having an acidic group.

For the graphene existing in the graphene/organic solvent dispersion liquid according to the present invention, the element ratio of nitrogen to carbon (N/C ratio) determined by X-ray photoelectron spectroscopy is preferably 0.005 or more and 0.020 or less, more preferably 0.010 or more and 0.015 or less. The nitrogen atoms existing on the graphene surface are attributed to the nitrogen-containing functional groups, such as amino group and nitro group, contained in the surface treatment agent and nitrogen-containing heterocyclic rings in the pyridine group, imidazole group, etc. To allow the graphene to have an improved dispersibility, it is preferable for a moderate number of such nitrogen atoms to exist on the graphene surface. If the N/C ratio of graphene is more than 0.020, the conductivity tends to decrease as nitrogen atoms substitute the graphene conjugated structures. On the other hand, the existence of a small amount of a nitrogen-containing surface treatment agent is preferred because it can contribute to the dispersibility graphene. Here, the N/C ratio, as in the case of the O/C ratio, can be determined from the peak areas of the C1s peak and the N1s peak.

<Production Method for the Graphene/Organic Solvent Dispersion Liquid>

The production method for the graphene/organic solvent dispersion liquid according to the present invention include, for example:

a reduction step for reducing graphene oxide dispersed in a water-containing dispersion medium;

an organic solvent mixing step for mixing the intermediate dispersion liquid resulting from the reduction step with an organic solvent;

a strong stirring step for stirring the intermediate dispersion liquid containing an organic solvent at a shear rate of 5,000 per second to 50,000 per second;

a water removal step for removing at least part of the water from the intermediate dispersion liquid by a combination of the addition of an organic solvent and suction filtration or by distillation;

which are carried out in this order. In particular, a final graphene/organic solvent dispersion liquid product with a high graphene dispersibility can be obtained if the reduction step and all subsequent steps (or all steps including the undermentioned fragmentation step and/or surface treatment step if such steps precede the reduction step) are carried out in a state where graphene is dispersed in a dispersion medium and prevented at all times from coming into a powder state.

[Preparation Method for Graphene Oxide]

There are no specific limitations on the method to be used for the preparation of graphene oxide, and a generally known method such as the Hummers method may be adopted. A commercially available graphene oxide product may also be used. Described below is an example procedure that uses the Hummers method to prepare graphene oxide.

Add graphite (graphite powder) and sodium nitrate to concentrated sulfuric acid and then add potassium permanganate little by little while stirring to prevent the temperature from rising. Continue stirring to maintain the reaction at 25° C. to 50° C. for 0.2 to 5 hours. Subsequently, add ion-exchanged water for dilution to prepare a suspension liquid and maintain the reaction at 80° C. to 100° C. for 5 to 50 minutes. Finally, add hydrogen peroxide and deionized water and maintain the reaction for 1 to 30 minutes to provide a graphene oxide/organic solvent dispersion liquid. Filtrate and wash the resulting graphene oxide/organic solvent dispersion liquid to provide gel of graphene oxide. This graphene oxide gel may be diluted for use in mixing treatment with a surface treatment agent or reduction treatment.

The graphite material used for producing graphene oxide may be either artificial graphite or natural graphite, of which, however, natural graphite is preferred. The grain size of the graphite raw material is preferably 20,000 mesh or less, more preferably 5,000 mesh or less.

Typical quantities of the reactants per 10 g of graphite are as follows: concentrated sulfuric acid 150 to 300 ml, sodium nitrate 2 to 8 g, potassium permanganate 10 to 40 g, and hydrogen peroxide 40 to 80 g. When adding sodium nitrate and potassium permanganate, use an ice bath to control the temperature. When adding hydrogen peroxide and deionized water, the weight of deionized water should be 10 to 20 times that of hydrogen peroxide. The concentrated sulfuric acid to be used preferably has a concentration by mass of 70% or more, more preferably 97% or more.

Graphene oxide has high dispersibility, but the substance itself has insulating properties and cannot serve as conductive additive or the like. If the graphene oxide material has an excessively high degree of oxidation, the graphene powder obtained by its reduction will likely be low in electric conductivity, and therefore, the proportion of carbon atoms to oxygen atoms in the graphene oxide material, determined by X-ray photoelectron spectroscopy, is preferably 0.5 or more. The graphene oxide material should be dry and free of solvents when subjected to X-ray photoelectron spectroscopy.

If graphite should not be oxidized thoroughly, flaky graphene powder will not be obtained easily in the reduction step. Therefore, it is preferable for the graphene oxide material to give no detectable peaks attributable to graphite when examined by X-ray diffraction after drying.

The degree of oxidation of the graphene oxide material can be controlled by changing the quantity of the oxidizing agent used to oxidize graphite. More specifically, the degree of oxidation increases with increasing quantities of sodium nitrate and potassium permanganate relative to the quantity of graphite used in the oxidization reaction, whereas the degree of oxidation decreases with decreasing quantities thereof. There are no specific limitations on the weight ratio of sodium nitrate to graphite, but it is preferably 0.200 or more and 0.800 or less, more preferably 0.250 or more and 0.500 or less, and still more preferably 0.275 or more and 0.425 or less. There are no specific limitations on the weight ratio of potassium permanganate to graphite, but it is preferably 1.00 or more, more preferably 1.40 or more, and still more preferably 1.65 or more. On the other hand, it is preferably 4.00 or less, more preferably 3.00 or less, and still more preferably 2.55 or less.

[Reduction Step]

In the reduction step, graphene oxide dispersed in a water-containing dispersion medium is reduced to graphene.

The water-containing dispersion medium may be water alone or may contain a solvent other than water. Such a solvent other than water is preferably a polar solvent, and examples include ethanol, methanol, 1-propanol, 2-propanol, N-methylpyrrolidone, dimethylformamide, dimethylacetamide, dimethylsulfoxide, and γ-butyrolactone. There are no specific limitations on the water fraction in the water-containing dispersion medium, but the water fraction is preferably 50 mass % or more if an inorganic reduction agent is to be added.

For the reduction step, it is preferable to use a reduction agent to perform chemical reduction. There are no specific limitations on the reduction agent to be used to reduce graphene oxide, and various organic reduction agents and inorganic reduction agents are useful, but the use of an inorganic reduction agent is preferable because of easiness of washing after the reduction step.

Useful organic reduction agents include aldehyde based reduction agents, hydrazine derivative reduction agents, and alcohol based reduction agents, of which alcohol based reduction agents are particularly preferred because they can perform relatively slow reduction. Useful alcohol based reduction agents include methanol, ethanol, propanol, isopropyl alcohol, butanol, benzyl alcohol, phenol, ethanol amine, ethylene glycol, propylene glycol, and diethylene glycol.

Useful inorganic reduction agents include sodium dithionite, potassium dithionite, phosphorous acid, sodium borohydride, and hydrazine. In particular, sodium dithionite and potassium dithionite are preferred because they can hold acidic groups relatively strongly during the reduction step, thereby serving to produce a graphene with high dispersibility in solvents (dispersion mediums).

[Washing Step]

After the reduction step, it is preferable to adopt a washing step designed for dilution with water and filtration in order to provide a gel-like dispersion liquid consisting mainly of graphene dispersed in water. In the present Description, any intermediate material, gel-like or not, that is not a finally completed graphene/organic solvent dispersion liquid according to the present invention, but forms before the completion of the production process and contains graphene or graphene oxide dispersed in a dispersion medium is referred to as an intermediate dispersion liquid for convenience's sake.

[Surface Treatment Step]

A surface treatment step designed for mixing an intermediate dispersion liquid with a surface treatment agent having an acidic group may be added, in some instances, before, after, or in the middle of the reduction step. Useful surface treatment agents are as given previously.

For proper mixing of graphene oxide and a surface treatment agent, it is preferable to perform the mixing in a state where both the graphene oxide and the surface treatment agent are dispersed in an aqueous solution. In this instance, it is preferable that both the graphene oxide and the surface treatment agent be completely dissolved, but part thereof may be left undissolved and dispersed in a solid state.

[Fine Fragmentation Step]

A fine fragmentation step designed for finely fragmenting the graphene may be added, in some instances, before, after, or in the middle of the reduction step. Graphene oxide is preferably in a finely fragmented state when used in the reduction step and therefore, the fine fragmentation step is preferably performed before the reduction step or in the middle of the reduction step.

The addition of the fine fragmentation step serves to allow the graphene oxide or graphene to have an appropriate size S in the planar direction. There are no specific limitations on the method to be used for the fine fragmentation, and available methods include one in which a plurality of pieces, such as beads and balls, of a crushing medium are mixed with a dispersion liquid and caused to strike against each other in order to crush and disperse the graphene oxide or graphene, but a medium-free technique in which a large shear force is applied to the dispersion liquid without using a crushing media is preferred because the agglomeration of pieces of graphene oxide or graphene can be induced in the former technique. For example, specific techniques include one in which a pressure is applied to an intermediate dispersion liquid to cause it to collide against a single ceramic ball and one that uses a liquid-liquid shearing type wet jet mill in which streams of an intermediate dispersion liquid are caused to collide against each other to achieve dispersion. The application of ultrasonic waves to an intermediate dispersion liquid is also a medium-free dispersion technique that is preferred.

In the fine fragmentation step, graphene oxide and graphene tend to be fragmented more finely with an increasing treatment pressure and output used in the medium-free dispersion method, and they also tend to be fragmented more finely with an increasing treatment time. The preferred size S in the planar direction of graphene is as described previously. The size of graphene obtained after the reduction step can be controlled by selecting an appropriate type of fine fragmentation treatment, treatment condition, and treatment time for the fine fragmentation step.

[Organic Solvent Mixing Step]

In order to replace the water in the intermediate dispersion liquid resulting from the reduction step with an organic solvent, an organic solvent mixing step is performed to mix the intermediate dispersion liquid and the organic solvent. In the organic solvent mixing step, the intermediate dispersion liquid resulting from the reduction step, or that further subject to a washing step, surface treatment step, and/or fine fragmentation step, in some instances, is mixed directly with an organic solvent. This means that once the reduction step is finished, the intermediate dispersion liquid is always in the state of a dispersion liquid until it is mixed with an organic solvent in the organic solvent mixing step, and any step, such as freeze-drying, designed to obtain powdery graphene by removing the dispersion medium from the intermediate dispersion liquid is not performed.

There are no specific limitations on the mixing ratio between the intermediate dispersion liquid and the organic solvent in the organic solvent mixing step, but handling will be difficult due to increased viscosity if the quantity of the organic solvent mixed is too small, whereas the efficiency of treatment will be low due to a decreased quantity of graphene per unit treatment volume if the quantity of the organic solvent mixed is too large. With the aim of increasing the treatment efficiency while allowing the dispersion liquid to maintain a low viscosity to ensure easy handling, it is preferable to add 10 to 3,000 parts by mass, more preferably 20 to 2,000 parts by mass, and still more preferably 50 to 1,500 parts by mass, of the organic solvent to 100 parts by mass of the intermediate dispersion liquid resulting from the reduction step.

Useful organic solvents are as given previously.

[Strong Stirring Step]

To produce a graphene/organic solvent dispersion liquid with a small bound water fraction as in the present invention, it is effective to perform a step designed to stir the intermediate dispersion liquid resulting from the organic solvent mixing step at a shear rate of 5,000 per second to 50,000 per second (strong stirring step). The strong stirring step is intended to decrease the volume of bound water contained in the intermediate dispersion liquid. It should be noted that in the present Description, any rotary blade type mixer that can apply a required shear force to an intermediate dispersion liquid is referred to as a high shear mixer. Simple repeating of a solvent replacement procedure is effective only to remove free water and adsorbed water and cannot serve for easy production of a graphene/organic solvent dispersion liquid with a small bound water fraction in some instances for the present invention. The strong stirring step uses a high shear mixer to exfoliate the graphene to break down the layered agglomeration of the graphene. A shear force is applied between the graphene surface and the organic solvent after breaking down the layered agglomeration between graphene layers, and this serves to decrease the volume of bound water by liberating it from the graphene surface into the solvent phase.

For the strong stirring step, the shear rate is 5,000 per second to 50,000 per second. The shear rate is calculated by dividing the circumferential speed at the end of the maximum diameter of the rotary blade of the mixer by the distance from the wall surface to the tip of the rotary blade of the mixer (the tip of the blade that defines the maximum diameter). The circumferential speed of the rotary blade of a mixer is calculated as circumference x rotating speed. If the shear rate is too small, the graphene will not undergo exfoliation easily, making it difficult to decrease the volume of bound water on the graphene surface. If the shear rate is too large, on the other hand, the degree of graphene exfoliation will become too high, causing a decrease in dispersibility. The shear rate is preferably 10,000 or more per second and more preferably 15,000 or more per second. Similarly, it is preferably 45,000 or less per second and more preferably 40,000 or less per second. Furthermore, the treatment in the strong stirring step preferably lasts for 15 seconds to 300 seconds, more preferably for 20 seconds to 120 seconds, and still more preferably for 30 seconds to 80 seconds.

The high shear mixer used in the strong stirring step should be of a thin film rotation type, rotor/stator type, etc., in which the distance between the rotating blade and the wall surface is short, specifically 10 mm or less, and it is preferably a medium-free mixer. Examples of such a mixer include Filmics (registered trademark) Model 30-30 (manufactured by Primix), Clearmix (registered trademark) CLM-0.8S (manufactured by M Technique. Co. Ltd.), and Super Shear Mixer SDRT 0.35-0.75 (manufactured by Satake Chemical Equipment Mfg., Ltd.).

[Water Removal Step]

The water removal step is designed for removing at least part of the water of the intermediate dispersion liquid by a combination of the addition of an organic solvent and suction filtration or by distillation. The use of such a solvent removal means as compression filtration or centrifugal separation that applies a large force to graphene contained in the dispersion liquid tends to cause layered agglomeration of the graphene. To ensure effective removal of bound water, the water removal step should be performed at a stage after the strong stirring step.

To carry out the combination of the addition of an organic solvent and suction filtration during the water removal step, it is preferable to add an organic solvent to the intermediate dispersion liquid and stir it, followed by performing suction filtration under reduced pressure. Specifically, such suction filtration under reduced pressure can be carried out by filtering the liquid while performing suction using a Buchner funnel, Hirsch funnel, or the like. By repeating the organic solvent mixing step and suction filtration several times, free water and adsorbed w-{ }-ater can be removed from the intermediate dispersion liquid. Useful organic solvents are as given previously.

If the organic solvent has a boiling point higher than that of water, water is preferably removed by distillation. There are no specific limitations on the pressure to be used for the distillation, but vacuum distillation is preferred because water can be removed efficiently.

[Heating Step]

In addition, a step for heating the intermediate dispersion liquid at 70° C. or more (heating treatment step) is preferably carried out at a stage after the reduction step. The heating step serves for further reduction of the bound water in the intermediate dispersion liquid. The heating treatment step may be carried out by, for example, feeding the intermediate dispersion liquid into a heating and stirring apparatus and stirring it while heating in such a manner that it will not be dried. The heating temperature is more preferably 80° C. or more. At very high temperatures, however, part of the functional groups such as the hydroxyl group can be desorbed from graphene and accordingly, the heating temperature is preferably 150° C. or less and more preferably 120° C. or less. From the viewpoint of efficient removal of water, furthermore, it is particularly preferable for the heating step and the strong stirring step to be performed simultaneously, which may be achieved by carrying out the stirring treatment by a high shear mixer while heating.

In the case where distillation is adopted for the water removal step, its simultaneous implementation with the heating treatment step can be achieved by performing distillation while heating at 70° C. or more, and this is preferable because free water, adsorbed water, and bound water can be removed simultaneously in one stage. In this case, the method of performing vacuum distillation while heating at 70° C. or more is particularly preferable. More specifically, a good means is the use of a heating and stirring apparatus equipped with a rotary evaporator or a vacuum line.

<Production Method for Lithium Ion Battery Electrode>

The production method for lithium ion battery electrodes according to the present invention includes a step for mixing the aforementioned graphene/organic solvent dispersion liquid with an electrode active material for lithium ion batteries.

A lithium ion battery electrode can be produced by mixing an active material for a positive or negative electrode, a conductive additive, and a binder, as well as a solvent in some instances, to prepare an electrode paste, and applying this electrode paste over a conductive collector, followed by drying. The graphene dispersion liquid according to the present invention can serve for both positive electrode production and negative electrode production.

There are no specific limitations on positive electrode active materials, and useful ones include composite oxides of lithium and transition metals such as lithium cobaltate ($LiCoO_2$), lithium nickelate ($LiNiO_2$), spinel type lithium manganate ($LiMn_2O_4$), ternary compounds with cobalt partially substituted by nickel and manganese ($LiMn_xNi_yCo_{1-x-y}O_2$), and spinel type lithium manganate ($LiMn_2O_4$); olivine based (phosphoric acid based) active materials such as iron lithium phosphate ($LiFePO_4$); metal oxides such as $V_2O_5$; metal compounds such as $TiS_2$, $MoS_2$, and $NbSe_2$; and elemental sulfur and organic positive electrode materials. There are no specific limitations on negative electrode active materials, and useful ones include carbon based materials such as natural graphite, artificial graphite, and hard carbon; silicon compounds containing SiO, SiC, SiOC, etc., as basic constituents; elemental silicon; and metal oxides such as manganese oxide (MnO) and cobalt oxide (CoO) that can undergo conversion reaction with lithium ions.

The conductive additive to be used may be the graphene/organic solvent dispersion liquid according to the present invention alone, or another conductive additive may be adopted in addition. There are no specific limitations on the additional conductive additive, and useful examples include carbon black materials such as furnace black, Ketjen Black (registered trademark), and acetylene black, graphite materials such as natural graphite (scale-like graphite etc.) and artificial graphite, conductive fibers such as carbon fiber and metal fiber, and powdery metals such as copper, nickel, aluminum, and silver.

Useful binder materials include fluorine based polymers such as polyvinylidene fluoride (PVDF) and polytetrafluoroethylene (PTFE); and rubbers such as styrene butadiene rubber (SBR) and natural rubber.

Electrode paste for lithium ion batteries can be produced by mixing an electrode active material, a conductive additive, and a binder as described above with an appropriate quantity of solvent if required. A lithium ion battery electrode can be produced by applying the electrode paste over a conductive collector, followed by drying. Useful examples of the solvent include N-methylpyrrolidone, γ-butyrolactone, carboxymethyl cellulose, and dimethyl acetamide, but it is preferable to adopt the same solvent as the one contained in the graphene/organic solvent dispersion liquid used for electrode production. Among others, N-methylpyrrolidoneis a particularly preferred solvent.

There are no specific limitations on the technique to be used for the mixing of electrode paste for the lithium ion battery, and generally known mixers and kneading machines may be used. Such generally known mixers include automatic mortar, homogenizer, planetary mixer, Homodisper, and rotation and revolution type mixer, of which planetary mixer is particularly preferable.

There are no specific limitations on the type of collector as long as it is in the form of a conductive sheet or mesh, and it is a good practice to use a collector of metal foil or metal mesh that does not have significant influence on the electrochemical reaction. The collector to be used for the positive electrode is preferably in the form of aluminum foil or aluminum mesh. The collector to be used for the negative electrode is preferably in the form of copper foil or copper mesh. The metal foil to be used may be partly perforated to increase the electrode density.

A lithium ion battery electrode can be produced by applying the electrode paste mixed above over a conductive collector, followed by drying. There are no specific limitations on the coating method to be used to apply the electrode paste to a collector, and useful tools include Baker applicator, film applicator equipped with micrometer, bar coater, and doctor blade, which may be operated manually or using an automatic coating machine.

A lithium ion battery electrode should have good rate characteristics and cycle characteristics as important performance requirements. For common lithium ion batteries, the battery capacity decreases with an increasing charging and discharging speed. The rate characteristics are an indicator of the degree of remaining battery capacity when the battery is charged and discharged at high speeds. The performance of a lithium ion battery degrades as it is charged and discharged repeatedly. The cycle characteristics are an indicator of the degree of remaining battery capacity remaining the battery is charged and discharged repeatedly.

The conductive network in the electrode is an important factor in improving the rate characteristics of a lithium ion battery electrode. High speed charging becomes more difficult as the resistance in the electrode increases. The conductive network in an electrode is formed by the conductive additive added to the electrode. Improvement in rate characteristics is expected if a thin layer like conductive additive such as graphene can be dispersed in the electrode without undergoing agglomeration.

Containing a moderate quantity of bound water, the graphene/organic solvent dispersion liquid according to the present invention is high in dispersion stability and able to disperse smoothly in the electrode paste solvent. Accordingly, in the case of the lithium ion battery electrode prepared from the graphene/organic solvent dispersion liquid according to the present invention, it is possible to improve the conductivity in the electrode because the graphene is dispersed smoothly in the electrode. Furthermore, the graphene according to the present invention serves also to achieve a high ion conductivity when stacked in a layered manner, because the bound water existing in a moderate quantity works to form gaps. The use of the graphene/organic solvent dispersion liquid according to the present invention serves to provide lithium ion battery electrode having high electronic conductivity and ion conductivity in the electrode, as well as good rate characteristics. When using a graphene dispersion liquid with a small bound water fraction like the one according to the present invention, water electrolysis will not occur significantly in the charging and discharging reactions, enabling the improvement of cycle characteristics.

EXAMPLES

Measurement Example 1: Measurement of Water Fraction

A specimen of the graphene/organic solvent dispersion liquid was examined by AQ-2200 Karl Fischer Aquameter and a EV-2010 water vaporizing apparatus (manufactured by Hiranuma Sangyo Co., Ltd.) and its water fraction was determined by the water vaporization-coulometric titration method specified in JIS K 0113 (2005) 8.3. A specimen of the graphene/organic solvent dispersion liquid was fed to the water vaporizing apparatus and heated at 130° C. or 250° C., where measurements were taken to provide the water fraction values of W1 and W2. The values of W1 and W2 were calculated as weight fractions [g/g] of water relative to the weight of the graphene/organic solvent dispersion liquid.

Measurement Example 2: Solid Fraction (G)

A specimen of the graphene/organic solvent dispersion liquid was deposited on a glass substrate with a known weight and the total weight was measured, followed by heating for 1.5 hours on a hot plate with a temperature adjusted to 120° C. to volatilize the solvent. The solid fraction G (weight fraction [g/g] of the solid fraction relative to the weight of the graphene/organic solvent dispersion liquid) of the graphene dispersion liquid was determined from the weight of the graphene dispersion liquid specimen measured before heating and the weight of the solid fraction measured after heating. This procedure was repeated three times and the average was adopted.

Measurement Example 3: X-Ray Photoelectron Method

For each sample, the X-ray photoelectron measuring method was carried out using Quantera SXM (manufactured by PHI). The excited X-ray used was monochromatic Al Kα1,2 beam (1486.6 eV), and the X-ray beam diameter and photoelectron take-off angle were 200 μm and 45°, respectively. Assuming that the C1s main peak based on carbon atoms was at 284.3 eV, the peak near 533 eV was attributed to the O1s peak based on oxygen atoms and the peak near 402 eV was attributed to the N1s peak based on nitrogen atoms, followed by determining the O/C ratio and the N/C ratio from the area ratios of the peaks.

Measurement Example 4: Evaluation of Specific Surface Area

The specific surface area of graphene was measured by HM Model-1210 (manufactured by Macsorb). Measurements were made according to JIS Z8830 (2013). Specifically, the quantity of adsorbed gas was measured by the carrier gas method and the adsorption data were analyzed by the one point method. Deaeration was performed at 100° C. for 180 minutes.

Measurement Example 5: Evaluation of Battery Performance

The discharge capacity was measured as described below unless otherwise specified. N-methylpyrrolidone (NMP) is added to the graphene dispersion liquid prepared in each Example described below, mixed in a planetary mixer, and diluted to prepare a graphene/NMP dispersion liquid with a solid fraction of 1.5 mass %. The quantity of NMP added was calculated based on the solid fraction determined in Measurement example 2 and the specimen was diluted to 1.5 mass %. One hundred (100) parts by mass of the 1.5 mass % graphene/NMP dispersion liquid prepared above, 92 parts by mass of $LiNi_{0.5}Co_{0.2}Mn_{0.3}O_2$ used as electrode active material, 1.5 parts by mass of acetylene black as conductive additive, and 5 parts by mass of polyvinylidene fluoride as binder were mixed in a planetary mixer to prepare an electrode paste. The electrode paste was spread over a piece of aluminum foil (with a thickness of 18 μm) using a doctor blade (300 μm) and dried at 80° C. for 15 minutes, followed by vacuum drying to prepare an electrode plate.

A disk with a diameter of 15.9 mm was cut out from the electrode plate prepared above to use as positive electrode while a disk with a diameter of 16.1 mm to use as negative electrode was produced from a counter electrode mixture of 98 parts by mass of graphite, 1 part by mass of carboxymethyl cellulose sodium, and 1 part by mass of an aqueous SBR dispersion. A disk with a diameter 17 mm cut out from Celgard #2400 (manufactured by Celgard) was used as separator while a solvent of ethylene carbonate and diethyl carbonate mixed at a ratio of 7:3 containing 1M $LiPF_6$ was used as electrolyte to prepare a 2042 type coin battery, which was then subjected to battery performance evaluation.

A charging and discharging measurement run was repeated three times under the conditions of an upper limit voltage of 4.2 V, a lower limit voltage 3.0 V, and a rate of 0.1 C, 1 C, and 5 C in this order, and subsequently it was repeated 491 times at 1 C, thus carrying out a total of 500 charging and discharging runs. The discharge capacity was determined for the third of the runs performed at 1 C, the third of the runs performed at 5 C, and the 491st of the subsequent runs performed at 1 C.

Synthesis Example 1

Preparation method for graphene oxide: Natural graphite powder of 1,500 mesh (manufactured by Shanghai Yifan Graphite Co., Ltd.) was used as starting material, and 220 ml of 98% concentrated sulfuric acid, 5 g of sodium nitrate, and 30 g of potassium permanganate were added to 10 g of natural graphite powder in an ice bath, followed by mechanical stirring for 1 hour while maintaining the liquid mixture at a temperature of 20° C. or less. This liquid mixture was taken out of the ice bath and stirred in a 35° C. water bath for 4 hours to ensure thorough reaction, followed by pouring 500 ml of ion-exchanged water and continuing reaction of the resulting suspension liquid at 90° C. for additional 15 minutes. Finally, 600 ml of ion-exchanged water and 50 ml of hydrogen peroxide were added and reaction was continued for 5 minutes to provide a graphene oxide dispersion liquid. After filtering it while it is hot, the metal ion was washed with a dilute hydrochloric acid solution and the acid was washed with ion-exchanged water. Washing was performed repeatedly until reaching a pH of 7 to provide a graphene oxide gel.

The graphene oxide gel prepared was vacuum-dried and examined as described in Measurement example 3, showing that the element composition ratio of the oxygen atom to the carbon atom was 0.53.

Example 1

The graphene oxide gel prepared in Synthesis example 1 was diluted with ion-exchanged water to a concentration of 30 mg/ml and treated in an ultrasonic washing machine for 30 minutes to provide a uniform graphene oxide dispersion liquid.

A 20 ml portion of the resulting graphene oxide dispersion liquid and 0.3 g of dopamine hydrochloride used as surface treatment agent were mixed in Homodisper Model 2.5 (manufactured by Primix) at a rotating speed of 3,000 rpm for 60 minutes. The graphene oxide dispersion liquid treated above was subjected to ultrasonic treatment for 30 minutes using an ultrasonic apparatus (UP400S, manufactured by Hielscher) with an output of 300 W (fine fragmentation step). After the treatment, the graphene oxide dispersion liquid was diluted with ion-exchanged water to 5 mg/ml, and 0.3 g of sodium dithionite was added to 20 ml of the diluted dispersion liquid, followed by continuing reduction reaction for 1 hour while maintaining the temperature at 40° C. (reduction step). Subsequently, it was filtered through a reduced-pressure suction filtration machine, further diluted with ion-exchanged water to 0.5 mass %, and subjected to suction filtration. This washing step was repeated 5 times to ensure thorough washing, thus providing an aqueous graphene dispersion.

The resulting graphene aqueous dispersion was diluted to 0.5 mass % by adding NMP (organic solvent mixing step), and treated by Filmics (registered trademark) Model 30-30 (manufactured by Primix) at a circumferential speed of 40 m/s for 60 seconds (strong stirring step). In this instance, the distance between the rotary blade and the wall surface was 2 mm (0.02 m). The shear rate, calculated as (circumferential speed)/(distance to wall surface), is 20,000 per second. After the treatment, suction filtration was performed to remove the solvent. To further reduce the water fraction, NMP (dipole moment 4.09 Debye) was added to 0.5 mass % (organic solvent mixing step) and the liquid was treated using Homodisper Model 2.5 (manufactured by Primix) at a rotating speed of 3,000 rpm for 30 minutes, followed by reduced-pressure suction filtration of the diluted liquid (water removal step). This procedure was repeated twice to provide a graphene/organic solvent dispersion liquid.

The water fractions W1 and W2 of the resulting graphene/organic solvent dispersion liquid were measured as described in Measurement example 1, and the solid fraction G of the graphene/organic solvent dispersion liquid was measured as described in Measurement example 2, followed by calculating the value of (W2−W1)/G. For analysis, the graphene/organic solvent dispersion liquid was diluted 3 times with water and subjected to suction filtration, followed by repeating additional dilution and suction filtration twice to prepare a 0.5 mass % graphene/water dispersion liquid, which was freeze-dried to provide a graphene powder. For the resulting graphene powder, the specific surface area, O/C ratio, and N/C ratio were determined as described in Measurement examples 3 and 4. Furthermore, the resulting graphene/organic solvent dispersion liquid was subjected to battery performance evaluation as described in Measurement example 5 to determine the discharge capacity. Results obtained are summarized in Table 1.

Example 2

Except that the Filmics treatment was carried out under the conditions of a rotating speed of 30 m/s (shear rate 15,000 per second) for 60 seconds (strong stirring step), the same procedure as in Example 1 was carried out to provide a graphene/organic solvent dispersion liquid.

Physical properties evaluation and battery performance evaluation were carried out in the same manner as in Example 1. Results obtained are summarized in Table 1.

Example 3

Except that the Filmics treatment was carried out under the conditions of a rotating speed of 20 m/s (shear rate 10,000 per second) for 60 seconds (strong stirring step), the same procedure as in Example 1 was carried out to provide a graphene/organic solvent dispersion liquid.

Physical properties evaluation and battery performance evaluation were carried out in the same manner as in Example 1. Results obtained are summarized in Table 1.

Example 4

Except for using 0.3 g of sodium borohydride instead of 0.3 g of sodium dithionite as reduction agent, the same procedure as in Example 1 was carried out to provide a graphene/organic solvent dispersion liquid.

Physical properties evaluation and battery performance evaluation were carried out in the same manner as in Example 1. Results obtained are summarized in Table 1.

Example 5

Except for adding 0.1 g dopamine hydrochloride, the same procedure as in Example 1 was carried out to provide a graphene/organic solvent dispersion liquid.

Physical properties evaluation and battery performance evaluation were carried out in the same manner as in Example 1. Results obtained are summarized in Table 1.

Example 6

Except for not adding dopamine hydrochloride and not using a surface treatment agent, the same procedure as in Example 1 was carried out to provide a graphene/organic solvent dispersion liquid.

Physical properties evaluation and battery performance evaluation were carried out in the same manner as in Example 1. Results obtained are summarized in Table 1.

Example 7

Except for not performing the fragmentation step, the same procedure as in Example 1 was carried out to provide a graphene/organic solvent dispersion liquid.

Physical properties evaluation and battery performance evaluation were carried out in the same manner as in Example 1. Results obtained are summarized in Table 1.

Example 8

Except for heat-treating the intermediate dispersion liquid at 90° C. for 2 hours (heating step) after the strong stirring step, the same procedure as in Example 1 was carried out to provide a graphene/organic solvent dispersion liquid.

Physical properties evaluation and battery performance evaluation were carried out in the same manner as in Example 1. Results obtained are summarized in Table 1.

Example 9

All treatment steps down to the strong stirring step were carried out by the same procedure as in Example 1. Subsequently, in order to remove water by distillation, the intermediate dispersion liquid was treated by using a diaphragm pump and a rotary evaporator at 90° C. for 2 hours and then condensed by suction filtration (water removal step) to provide a graphene/organic solvent dispersion liquid.

Physical properties evaluation and battery performance evaluation were carried out in the same manner as in Example 1. Results obtained are summarized in Table 1.

Example 10

Except that the Filmics treatment was carried out under the conditions of a rotating speed of 20 m/s (shear rate 10,000 per second) for 60 seconds (strong stirring step), the same procedure as in Example 8 was carried out to provide a graphene/organic solvent dispersion liquid.

Physical properties evaluation and battery performance evaluation were carried out in the same manner as in Example 1. Results obtained are summarized in Table 1.

Example 11

Except for not adding dopamine hydrochloride and not using a surface treatment agent, the same procedure as in Example 9 was carried out to provide a graphene/organic solvent dispersion liquid.

Physical properties evaluation and battery performance evaluation were carried out in the same manner as in Example 1. Results obtained are summarized in Table 1.

Comparative Example 1

The Filmics treatment performed in Example 1 was replaced with treatment by Homodisper Model 2.5 (manufactured by Primix), which is lower in shear force than Filmics, performed at a rotating speed of 3,000 rpm for 30 minutes. In this instance, Homodisper had a rotary blade with a diameter of 30 mm and accordingly a calculated circumferential speed of 4.7 m/s. The container used for stirring had an inside diameter of 50 mm and the distance between the wall surface and the rotary blade was 10 mm. The shear rate is calculated at 470 per second. Except for this, the same procedure as in Example 1 was carried out to provide a graphene/organic solvent dispersion liquid. Physical properties evaluation and battery performance evaluation were carried out in the same manner as in Example 1. Results obtained are summarized in Table 1.

Comparative Example 2

All steps down to the reduction and washing steps were carried out by the same procedure as in Example 1 to provide an aqueous graphene dispersion. The liquid was diluted with water to 0.5 mass % and freeze-dried to provide a graphene powder. For the graphene powder, O/C ratio, N/C ratio, and the specific surface area were determined as described in Measurement examples 3 and 4.

This graphene powder was diluted to 0.5 mass % by adding NMP, treated by Homodisper Model 2.5 (manufactured by Primix) at a rotation speed of 3,000 rpm (shear rate 470 per second) for 30 minutes, and condensed by suction filtration to provide a graphene/organic solvent dispersion liquid.

The resulting graphene/organic solvent dispersion liquid was subjected to physical properties evaluation and battery performance evaluation as described in Measurement examples 1, 2, and 5 Results obtained are summarized in Table 1.

Comparative Example 3

All steps down to the reduction and washing steps were carried out by the same procedure as in Example 1 to provide an aqueous graphene dispersion. The liquid was diluted with water to 0.5 mass % and freeze-dried to provide a graphene powder. For the graphene powder, O/C ratio, N/C ratio, and the specific surface area were determined as described in Measurement examples 3 and 4.

This graphene powder was diluted to 0.5 mass % by adding NMP, treated by Filmics (registered trademark) Model 30-30 (manufactured by Prim ix) at a rotation speed of 40 m/s (shear rate 20,000 per second) for 60 seconds (strong stirring step), and condensed by suction filtration to provide a graphene/organic solvent dispersion liquid.

The resulting graphene/organic solvent dispersion liquid was subjected to physical properties evaluation and battery performance evaluation as described in Measurement examples 1, 2, and 5 Results obtained are summarized in Table 1.

Comparative Example 4

All steps down to the reduction and washing steps were carried out by the same procedure as in Example 1 to provide an aqueous graphene dispersion. The liquid was diluted with water to 0.5 mass % and freeze-dried to provide a graphene powder. This graphene powder was dried at 200° C. for 5 hours in a heating and drying apparatus.

For the graphene powder, the specific surface area, O/C ratio, and N/C ratio were determined as described in Measurement examples 3 and 4.

This graphene powder was diluted to 0.5 mass % by adding NMP, treated by Filmics (registered trademark) Model 30-30 (manufactured by Prim ix) at a rotation speed of 40 m/s (shear rate 20,000 per second) for 60 seconds (strong stirring step), and condensed by suction filtration to provide a graphene/organic solvent dispersion liquid.

The resulting graphene/organic solvent dispersion liquid was subjected to physical properties evaluation and battery performance evaluation as described in Measurement examples 1, 2, and 5 Results obtained are summarized in Table 1.

Comparative Example 5

The graphene oxide gel prepared in Synthesis example 1 was dried at 80° C. for 6 hours in a vacuum drier to provide a graphene oxide powder. The resulting graphene oxide powder was heated at 700° C. for 6 hours in an argon atmosphere to provide a heat-reduced graphene powder.

For the graphene powder, O/C ratio, N/C ratio, and the specific surface area were determined as described in Measurement examples 3 and 4.

This graphene powder was diluted to 0.5 mass % by adding NMP, treated by Homodisper Model 2.5 (manufactured by Primix) at a rotation speed of 3,000 rpm (shear rate 470 per second) for 30 minutes, and condensed by suction filtration to provide a graphene/organic solvent dispersion liquid.

The resulting graphene/organic solvent dispersion liquid was subjected to physical properties evaluation and battery performance evaluation as described in Measurement examples 1, 2, and 5 Results obtained are summarized in Table 1.

TABLE 1

| | Graphene preparation conditions | | | | Dispersion liquid preparation conditions | | | | | Physical properties of graphene/organic solvent dispersion liquid | | | | | | Battery performance evaluation | | |
|---|---|---|---|---|---|---|---|---|---|---|---|---|---|---|---|---|---|---|
| | Surface treatment agent | Reduction agent | Washing after reduction | Organic solvent | Fragmentation | Stirring | Heating | Water removal | Solid content g | (w2 − w1)g | Specific surface area [m²/g] | (W2 − W1)/ (G × specific surface area) [g/m²] | O/C ratio | N/C ratio | Discharge capacity 1 C [mah/g] | Discharge capacity 5 C [mah/g] | Discharge capacity 1 C (500 cycle) [mah/g] |
| Example 1 | dopamine hydrochloride 0.3 g | sodium dithionite | reduced-pressure suction filtration 5 times | NMP | ultrasonic 300 W 30 min | Filmics shear rate: 20,000/s for 60 s | — | NMP dilution and reduced-pressure suction filtration twice | 0.040 | 0.032 | 167 | 0.000192 | 0.15 | 0.013 | 140 | 95 | 126 |
| Example 2 | dopamine hydrochloride 0.3 g | sodium dithionite | reduced-pressure suction filtration 5 times | NMP | ultrasonic 300 W 30 min | Filmics shear rate: 15,000/s for 60 s | — | NMP dilution and reduced-pressure suction filtration twice | 0.040 | 0.036 | 157 | 0.000229 | 0.15 | 0.013 | 139 | 86 | 94 |
| Example 3 | dopamine hydrochloride 0.3 g | sodium dithionite | reduced-pressure suction filtration 5 times | NMP | ultrasonic 300 W 30 min | Filmics shear rate: 10,000/s for 60 s | — | NMP dilution and reduced-pressure suction filtration twice | 0.041 | 0.039 | 151 | 0.000258 | 0.15 | 0.013 | 128 | 68 | 89 |
| Example 4 | dopamine hydrochloride 0.3 g | sodium borohydride | reduced-pressure suction filtration 5 times | NMP | ultrasonic 300 W 30 min | Filmics shear rate: 20,000/s for 60 s | — | NMP dilution and reduced-pressure suction filtration twice | 0.041 | 0.034 | 132 | 0.000258 | 0.25 | 0.011 | 135 | 85 | 120 |
| Example 5 | dopamine hydrochloride 0.1 g | sodium dithionite | reduced-pressure suction filtration 5 times | NMP | ultrasonic 300 W 30 min | Filmics shear rate: 20,000/s for 60 s | — | NMP dilution and reduced-pressure suction filtration twice | 0.042 | 0.024 | 180 | 0.000133 | 0.13 | 0.003 | 146 | 94 | 115 |
| Example 6 | — | sodium dithionite | reduced-pressure suction filtration 5 times | NMP | ultrasonic 300 W 30 min | Filmics shear rate: 20,000/s for 60 s | — | NMP dilution and reduced-pressure suction filtration twice | 0.043 | 0.021 | 457 | 0.000046 | 0.11 | 0 | 125 | 64 | 112 |
| Example 7 | dopamine hydrochloride 0.3 g | sodium dithionite | reduced-pressure suction filtration 5 times | NMP | — | Filmics shear rate: 20,000/s for 60 s | — | NMP dilution and reduced-pressure suction filtration twice | 0.040 | 0.046 | 150 | 0.000307 | 0.15 | 0.013 | 120 | 30 | 84 |
| Example 8 | dopamine hydrochloride 0.3 g | sodium dithionite | reduced-pressure suction filtration 5 times | NMP | ultrasonic 300 W 30 min | Filmics shear rate: 20,000/s for 60 s | 90° C. 2 h | NMP dilution and reduced-pressure suction filtration twice | 0.041 | 0.027 | 140 | 0.000193 | 0.15 | 0.013 | 141 | 84 | 128 |

TABLE 1-continued

| | Graphene preparation conditions | | | Dispersion liquid preparation conditions | | | | | Physical properties of graphene/organic solvent dispersion liquid | | | | | Battery performance evaluation | | | |
|---|---|---|---|---|---|---|---|---|---|---|---|---|---|---|---|---|---|
| | Surface treatment agent | Reduction agent | Washing after reduction | Organic solvent | Fragmentation | Stirring | Heating | Water removal | Solid content g | (w2 − w1)/g | Specific surface area [m²/g] | (W2 − W1)/ (G × specific surface area) [g/m²] | O/C ratio | N/C ratio | Discharge capacity 1 C [mah/g] | Discharge capacity 5 C [mah/g] | Discharge capacity 1 C (500 cycle) [mah/g] |
| Example 9 | dopamine hydrochloride 0.3 g | sodium dithionite | reduced-pressure suction filtration 5 times | NMP | ultrasonic 300 W 30 min | Filmics shear rate: 20,000/s for 60 s | 90° C. 2 h (combined with distillation) | distillation | 0.041 | 0.018 | 142 | 0.000127 | 0.15 | 0.013 | 142 | 95 | 131 |
| Example 10 | dopamine hydrochloride 0.3 g | sodium dithionite | reduced-pressure suction filtration 5 times | NMP | ultrasonic 300 W 30 min | Filmics shear rate: 10,000/s for 60 s | 90° C. 2 h | NMP dilution and reduced-pressure suction filtration twice | 0.040 | 0.025 | 143 | 0.000175 | 0.15 | 0.013 | 136 | 90 | 120 |
| Example 11 | — | sodium dithionite | reduced-pressure suction filtration 5 times | NMP | ultrasonic 300 W 30 min | Filmics shear rate: 20,000/s for 60 s | 90° C. 2 h (combined with distillation) | distillation | 0.040 | 0.017 | 148 | 0.000115 | 0.15 | 0 | 127 | 70 | 113 |
| Comparative example 1 | dopamine hydrochloride 0.3 g | sodium dithionite | reduced-pressure suction filtration 5 times | NMP | ultrasonic 300 W 30 min | Homodisper shear rate: 470/s for 30 min | — | NMP dilution and reduced-pressure suction filtration twice | 0.041 | 0.097 | 156 | 0.000622 | 0.15 | 0.013 | 85 | 40 | 11 |
| Comparative example 2 | dopamine hydrochloride 0.3 g | sodium dithionite | reduced-pressure suction filtration 5 times →freeze drying | NMP | ultrasonic 300 W 30 min | Homodisper shear rate: 470/s for 30 min | — | suction filtration only | 0.041 | 0.092 | 161 | 0.000571 | 0.15 | 0.013 | 74 | 25 | 9 |
| Comparative example 3 | dopamine hydrochloride 0.3 g | sodium dithionite | reduced-pressure suction filtration 5 times →freeze drying | NMP | ultrasonic 300 W 30 min | Filmics shear rate: 20,000/s for 60 s | — | suction filtration only | 0.041 | 0.086 | 161 | 0.000534 | 0.15 | 0.013 | 100 | 56 | 0 |
| Comparative example 4 | dopamine hydrochloride 0.3 g | sodium dithionite | reduced-pressure suction filtration 5 times →freeze drying →drying 200° C. 5 h | NMP | ultrasonic 300 W 30 min | Filmics shear rate: 20,000/s for 60 s | — | suction filtration only | 0.041 | 0.002 | 121 | 0.000017 | 0.1 | 0.01 | 95 | 54 | 30 |
| Comparative example 5 | — | heated reduction | — | NMP | ultrasonic 300 W 30 min | Homodisper shear rate: 470/s for 30 min | — | suction filtration only | 0.040 | 0.002 | 475 | 0.000004 | 0.06 | 0 | 86 | 40 | 31 |

The invention claimed is:

1. A graphene/organic solvent dispersion liquid comprising graphene dispersed in an organic solvent and having a value of (W2−W1)/G in the range of 0.005 or more and 0.05 or less, wherein W1 and W2 are the water fractions measured at 130° C. and 250° C., respectively, by the Karl Fischer's method and G is the solid fraction of the graphene.

2. A graphene/organic solvent dispersion liquid as claimed in claim 1, wherein the graphene has a specific surface area, which is determined by the BET measuring method, of 80 m²/g or more and 250 m²/g or less.

3. A graphene/organic solvent dispersion liquid as claimed in claim 1, wherein the quotient of the value of (W2−W1)/G divided by the specific surface area measured by the BET measuring method is 0.000025 g/m² or more and 0.00025 g/m² or less.

4. A graphene/organic solvent dispersion liquid as claimed in claim 1, wherein the organic solvent has a boiling point of 150° C. or more.

5. A graphene/organic solvent dispersion liquid as claimed in claim 1, wherein the organic solvent has a dipole moment of 3.0 Debye or more.

6. A graphene/organic solvent dispersion liquid as claimed in claim 5, wherein the organic solvent is N-methylpyrrolidone.

7. A graphene/organic solvent dispersion liquid as claimed in claim 1, wherein the graphene has an element ratio of oxygen to carbon (O/C ratio), which is determined by X-ray photoelectron spectroscopy, of 0.08 or more and 0.30 or less.

8. A graphene/organic solvent dispersion liquid as claimed in claim 1, wherein the graphene has an element ratio of nitrogen to carbon (N/C ratio), which is determined by X-ray photoelectron spectroscopy, of 0.005 or more and 0.020 or less.

9. A graphene/organic solvent dispersion liquid as claimed in claim 1, wherein the median diameter D (μm) of the graphene measured by the laser diffraction/scattering type particle size distribution measurement method and the average size S (μm) in the planar direction of the graphene calculated from the arithmetic mean of the longest diameter and shortest diameter of the graphene observed by a laser microscope meet both Equations (1) and (2) given below:

$$0.5 \ \mu m \leq S \leq 15 \ \mu m \quad (1)$$

and $$1.0 \leq D/S \leq 3.0 \quad (2).$$

10. A graphene/organic solvent dispersion liquid as claimed in claim 1, wherein the average thickness T (μm) of the graphene observed by a laser microscope preferably meets Equation (3) given below:

$$100 \leq S/T \leq 1500 \quad (3).$$

11. A graphene/organic solvent dispersion liquid as claimed in claim 1 comprising a solvent having a N-methylpyrrolidone content of 50 mass % or more and, when diluted with N-methylpyrrolidone to a graphene weight fraction of 0.000013, giving a diluted solution having a weight-based absorptivity coefficient, which is calculated by Equation (4) given below, of 25,000 cm-1 or more and 200,000 cm-1 or less at a wavelength of 270 nm:

$$\text{weight-based absorptivity coefficient (cm}^{-1}\text{)} = \text{absorbance}/\{0.000013 \times \text{cell's optical path length (cm)}\} \quad (4).$$

12. A graphene/organic solvent dispersion liquid as claimed in claim 1, wherein the solid fraction is 0.003 or more and 0.4 or less.

13. A production method for lithium ion battery electrodes comprising a step for mixing a graphene/organic solvent dispersion liquid as claimed in claim 1 and an active material for lithium ion batteries.

14. A production method for the graphene/organic solvent dispersion liquid comprising the following steps performed in this order:
   a reduction step for reducing graphene oxide dispersed in a water-containing dispersion medium;
   an organic solvent mixing step for mixing the intermediate dispersion liquid resulting from the reduction step with an organic solvent;
   a strong stirring step for stirring the intermediate dispersion liquid containing an organic solvent at a shear rate of 5,000 per second to 50,000 per second; and
   a water removal step for removing at least part of the water from the intermediate dispersion liquid by a combination of the addition of an organic solvent and suction filtration or by distillation.

15. A production method for the graphene/organic solvent dispersion liquid as claimed in claim 14 further comprising a heating treatment step for heating the intermediate dispersion liquid at 70° C. or more at a stage after the reduction step.

* * * * *